United States Patent [19]

Morikawa et al.

[11] 4,416,853

[45] Nov. 22, 1983

[54] CU-AG BASE ALLOY BRAZING FILLER MATERIAL

[75] Inventors: Masaki Morikawa; Hideaki Yoshida, both of Kasukabe; Kunio Kishida, Ohmiya; Chuji Tanaka, Ageo, all of Japan

[73] Assignee: Mitsubishi Kinzoku Kabushiki Kaisha, Tokyo, Japan

[21] Appl. No.: 373,498

[22] PCT Filed: Aug. 25, 1981

[86] PCT No.: PCT/JP81/00189

§ 371 Date: Apr. 16, 1982

§ 102(e) Date: Apr. 16, 1982

[87] PCT Pub. No.: WO82/00790

PCT Pub. Date: Mar. 18, 1982

[30] Foreign Application Priority Data

Sep. 1, 1980 [JP] Japan .................................. 55-120870
Sep. 1, 1980 [JP] Japan .................................. 55-120871
Oct. 6, 1980 [JP] Japan .................................. 55-139535

[51] Int. Cl.$^3$ .............................................. C22C 9/00

[52] U.S. Cl. .................................... 420/469; 420/470; 420/473; 420/485; 420/487; 420/489; 420/490

[58] Field of Search ............... 420/469, 485, 487, 501, 420/502, 490, 473, 470, 489, 496, 587; 148/32

[56] References Cited

U.S. PATENT DOCUMENTS 3,693,246 9/1972 Novikov et al. ................... 420/487
3,977,869 8/1976 Steine et al. ....................... 420/490

Primary Examiner—L. Dewayne Rutledge
Assistant Examiner—Debbie Yee
Attorney, Agent, or Firm—Frishauf, Holtz, Goodman & Woodward

[57] ABSTRACT

A Cu-Ag alloy brazing filler material with low Ag content that exhibits excellent brazability and has a low vapor pressure is disclosed. The filler material comprises 5 to 35% by weight of Ag, 2.5 to 13% by weight of Si, with the balance being Cu and incidental impurities. The properties of the filler material can be improved further by addition of at least one element selected from the group consisting of Sn, In, Fe, Ni, Co, B and Li.

8 Claims, No Drawings

CU-AG BASE ALLOY BRAZING FILLER MATERIAL

TECHNICAL FIELD

The present invention relates to an inexpensive Cu-Ag base alloy brazing filler material that has a relative low silver content and low vapor pressure, and yet achieves satisfactory brazing.

BACKGROUND ART

The technique of vacuum brazing is used to fabricate electron tubes and vacuum tubes. If a brazing filler material having high vapor pressure is exposed to the vacuum brazing atmosphere, the vapor fouls the area to be brazed as well as the inner wall of the vacuum furnace. The brazed part is also exposed to high temperatures during the service of the tubes, and the filler material is evaporated to give a vapor that not only reduces the degree of vacuum in the tubes but also fouls their interior. For these reasons, an alloy having low vapor pressure is used as the brazing filler material. Typical filler materials having low vapor pressure include an Ag-Cu alloy filler material (silver brazing filler metal BAg-8 of JIS Z 3261) consisting of 27–29% Cu with the balance being Ag and incidental impurities and an Ag-Cu-Sn alloy brazing material consisting of 59–61% Ag, 9.5–10.5% Sn, with the balance being CU and incidental impurities (all percents used herein are by weight). One example of each type is listed in Table 26.1 on page 297 of "Brazing Manual" published by Kogaku Tosho Shuppan, October 1980 which is a translation of "Brazing Manual", 3rd ed., edited by American Welding Society, 1976. But the silver content of these conventional Cu-Ag base alloy filler materials is so high that with the rapid increase and considerable fluctuation in the price of silver in recent years, economic considerations put rigid limits on expanding the applications of these filler materials. At the same time, it has been desired to improve the brazability, especially wetting property, of the conventional Ag-Cu alloy filler materials. Attempts have been made to reduce the silver content, but this results in reduced wettability and increased brazing temperatures, which in turn impair the brazability of the filler materials. Multi-component alloy filler materials with improved brazing properties have been proposed, but they raise new problems with respect to workability and vapor pressure. Hence, no low-Ag, brazing filler metal is commercially available that has good properties, workability and low vapor pressure.

DISCLOSURE OF THE INVENTION:

Therefore, the present invention made studies to produce a brazing filler material that has a relatively low silver content, low vapor pressure and satisfactory workability, and also achieves good brazability. As a result, they successfully obtained an alloy that meets all of these requirements. The filler alloy material according to the present invention comprises 5 to 35% of Ag, 2.5 to 13% of Si, with the balance being Cu and incidental impurities. The inventors have found that this Cu-Ag base alloy has a significantly lower Ag content than the conventional Ag-Cu base alloys and yet, without decreasing the wetting property and workability, it has a lower vapor pressure and melting point than the conventional products.

If further reduction in the melting point and improved wettability are desired when, for example, the brazing filler material must flow into a very small brazing area, 1 to 10% of Sn or In or both can be added to the alloy having the above indicated basic composition. The additional element increases the wetting property of the alloy and lowers its melting point, with the result that the brazing properties of the alloy are improved.

If a stronger brazed area is desired, adding 1 to 10% of at least one element selected from among Fe, Ni and Co to the basic compostion is effective.

Further improvement in the wetting property is obtained by addition of a small amount of B or Li, and the physical and mechanical properties of the filler alloy are not changed greatly if the amount of B or Li added is very small. So, if improved wetting property is particularly needed, 0.001 to 0.8% of B or Li or both may be added to the basic composition. The experiment conducted by the present inventors revealed that unlike the addition of Sn or In, these occurred little reduction in the melting point and yet further improvement in the wetting property was achieved.

The present invention has been accomplished on the basis of these findings. The criticality of the amounts of the respective components defined above is described below.

(a) Ag

Silver is effective in lowering the melting point and improving the wetting property.

In consideration of this effectiveness and economic factors, the silver content is limited to the range of from 5% to not more than 35%.

(b) Si

Silicon is capable of reducing the melting point and improving the wetting property of the filler material without increasing its vapor pressure. If the silicon content is less than 2.5%, these effects are not achieved (see comparative brazing filler material No. 1 below), and a certain amount of silicon is necessary for reducing the melting point of an alloy with reduced silver content. But if the silicon content exceeds 13%, the melting point of the brazing filler material is increased and the filler material becomes brittle, with the result that the strength of the brazed area is reduced (see comparative brazing filler material No. 2 below). Therefore, the silicon content is limited to the range of from 2.5 to 13%.

(c) Sn and In

These elements are effective in lowering the melting point of the brazing filler material further and improving the wetting property further. To achieve these effects, the total Sn and In content is limited within the range the range of from 1 to 10%.

(d) Fe, Ni and Co

These elements are able to increase the strength of the brazing filler material further without reducing its ductility. To achieve these effects, the total Fe, Ni and Co content is limited to within the range of from 1 to 10%.

(e) B and Li

These are able not only to prevent the oxidation of the brazing filler material during brazing and remove the oxide film on the surface of the objects to be brazed but they also inhibit greatly the dissolution of gases into the melted filler material and provide a sound brazed area. To achieve these effects, the total B and Li content is limited to within the range of from 0.001 to 0.8%.

EXAMPLE

Brazing filler samples Nos. 1 to 50, conventional brazing filler samples Nos. 1 and 2 and comparative brazing filler samples Nos. 1 and 2 were produced by the conventional casting and working method. The spreading area, vapor pressure, and melting point of the respective filler samples, as well as the strength of the brazed area were measured. The spreading area was measured in accordance with JIS.Z 3191, wherein the spreading area of the respective samples over a stainless steel plate JIS.SUS 304 heated at 850° C. (900° C. for the comparative samples) in an argon atmosphere was measured. Thereafter, the vapor pressure of the filler samples which were remelted at 850° C. as though they were brazed, was measured at 600° C. with a Rodebush Walter apparatus (see "Vacuum Engineering Handbook", published by Asakura Shoten, October 1965, p. 321).

The melting point of the samples was measured by using a differential thermal analysis curve (see "Physical Metallurgical Measurement (II)", page 165 of New Lectures on Metals, the Japan Institute of Metals).

The strength of the brazed joint was measured as follows: two cylindrical pure nickel bars (10 mm$\phi$×50 mm long) were butted against each other and brazed with the respective filler samples (0.25 mm thick) at 850° C. (900° C. for the comparative samples). The brazed area for 12.5 mm on each side of the joint was reduced to a diameter of 6 mm and subjected to a tensile strength test with a Model TTDM tester of Instron Corporation, U.S.A. with a capacity of 10 tons. The results of the measurements are listed in Table 1.

As shown in Table 1, filler samples Nos. 1 to 50 of the present invention had a lower silver content than conventional samples Nos. 1 and 2 and yet their wetting property and fluidity were equal to or better than those of the conventional samples. In addition, the filler samples of the present invention had a lower vapor pressure than the conventional samples. The comparative filler samples Nos. 1 and 2 had a silicon content outside the range defined by the present invention, and they had a higher melting point than the samples of the present invention, and comparative sample No. 2 with much silicon formed a very weak brazed area.

As described above, the brazing filler materials of the present invention exhibit good brazing and have a very low vapor pressure, and hence can be used in fabrication of electron tubes and vacuum tubes that require the use of a brazing filler having these characteristics. As a further industrial advantage, the brazing filler materials of the present invention have a minimum content of expensive silver, so they can be used in a wide range of applications.

TABLE 1

| Sample No. | | Composition (Wt %) | | | | | | | | | | Spread of filler material (cm$^2$) | Vapor Pressure at 600° C. (mmHg) | m.p. (°C.) | Strength of brazed joint (Kg/mm$^2$) |
|---|---|---|---|---|---|---|---|---|---|---|---|---|---|---|---|
| | | Cu | Ag | Si | Fe | Ni | Co | B | Li | Sn | In | | | | |
| Conventional filler | 1 | 27.6 | bal. | — | — | — | — | — | — | — | — | 0.71 | 5 × 10$^{-8}$ | 780 | 26.4 |
| | 2 | 30.0 | bal. | — | — | — | — | — | — | 10.0 | — | 0.78 | 5 × 10$^{-8}$ | 718 | 24.8 |
| Comparative filler | *1 | bal. | 33.0 | 2.0 | — | — | — | — | — | — | — | 0.86 | ≦1 × 10$^{-8}$ | 865 | 27.4 |
| | *2 | " | 6.0 | 14.0 | — | — | — | — | — | — | — | 1.13 | | 860 | 18.0 |
| Filler of the Present Invention | 1 | " | 5.1 | 7.01 | — | — | — | — | — | — | — | 0.89 | | 842 | 29.2 |
| | 2 | " | 12.9 | 7.20 | — | — | — | — | — | — | — | 0.94 | | 828 | 29.8 |
| | 3 | " | 25.0 | 3.53 | — | — | — | — | — | — | — | 0.90 | | 805 | 30.3 |
| | 4 | " | 34.0 | 2.51 | — | — | — | — | — | — | — | 0.92 | | 813 | 30.9 |
| | 5 | " | 24.6 | 12.80 | — | — | — | — | — | — | — | 1.13 | ≦1 × 10$^{-8}$ | 766 | 23.7 |
| | 6 | " | 24.9 | 7.91 | — | — | — | — | — | 9.5 | — | 1.14 | | 733 | 26.1 |
| | 7 | " | 25.1 | 7.58 | — | — | — | — | — | 4.2 | 3.8 | 1.11 | | 734 | 26.4 |
| | 8 | " | 24.6 | 7.49 | — | — | — | — | — | 5.2 | — | 1.09 | | 738 | 27.3 |
| | 9 | " | 25.0 | 7.40 | — | — | — | — | — | — | 1.2 | 1.04 | | 744 | 29.6 |
| | 10 | " | 25.2 | 7.16 | — | — | — | — | — | 2.3 | 2.5 | 1.08 | | 736 | 27.7 |
| | 11 | " | 5.1 | 7.0 | — | 4.9 | — | — | — | — | — | 0.89 | | 848 | 32.9 |
| | 12 | " | 12.9 | 7.2 | — | 4.7 | — | — | — | — | — | 0.92 | ≦1 × 10$^{-8}$ | 841 | 33.4 |
| | 13 | " | 21.5 | 7.2 | — | 5.1 | — | — | — | — | — | 0.97 | | 762 | 34.1 |
| | 14 | " | 28.6 | 7.0 | — | 5.2 | — | — | — | — | — | 0.98 | | 760 | 34.0 |
| | 15 | " | 34.7 | 7.3 | — | 4.8 | — | — | — | — | — | 1.20 | 2 × 10$^{-8}$ | 758 | 34.6 |
| | 16 | " | 24.3 | 2.7 | — | 5.0 | — | — | — | — | — | 0.88 | | 831 | 31.4 |
| | 17 | " | 24.6 | 12.8 | — | 5.2 | — | — | — | — | — | 1.13 | | 795 | 28.0 |
| | 18 | " | 25.1 | 7.8 | 1.1 | — | — | — | — | — | — | 1.06 | | 758 | 31.2 |
| | 19 | " | 24.9 | 7.6 | — | 1.2 | — | — | — | — | — | 1.07 | | 757 | 31.5 |
| | 20 | " | 24.6 | 7.9 | — | — | 1.1 | — | — | — | — | 1.07 | ≦1 × 10$^{-8}$ | 756 | 31.3 |
| | 21 | " | 24.3 | 7.6 | 5.8 | — | — | — | — | — | — | 0.97 | | 759 | 34.1 |
| | 22 | " | 24.6 | 7.5 | — | — | 6.0 | — | — | — | — | 0.97 | | 761 | 34.6 |
| | 23 | " | 25.0 | 7.2 | 9.8 | — | — | — | — | — | — | 0.91 | | 776 | 35.8 |
| | 24 | " | 25.2 | 7.4 | — | 4.3 | 4.9 | — | — | — | — | 0.92 | | 777 | 34.9 |
| | 25 | " | 24.5 | 7.0 | 3.1 | 2.5 | 2.1 | — | — | — | — | 0.92 | | 779 | 35.0 |
| | 26 | " | 24.3 | 7.2 | — | 5.1 | — | — | — | 1.2 | — | 1.00 | | 756 | 33.9 |
| | 27 | " | 24.9 | 7.2 | — | — | 4.9 | — | — | — | 5.2 | 1.05 | | 747 | 32.3 |
| | 28 | " | 24.4 | 7.1 | 5.1 | 2.1 | — | — | — | 9.6 | — | 1.13 | ≦1 × 10$^{-8}$ | 741 | 31.7 |
| | 29 | " | 24.2 | 7.3 | — | 9.6 | — | — | — | 3.8 | 4.2 | 1.12 | | 750 | 32.0 |
| | 30 | " | 24.7 | 7.0 | 3.2 | 2.8 | 1.5 | — | — | 4.1 | 3.1 | 1.11 | | 746 | 31.5 |
| | 31 | " | 5.2 | 7.3 | — | — | — | 0.32 | — | — | — | 0.98 | ≦1 × 10$^{-8}$ | 841 | 29.7 |
| | 32 | " | 13.6 | 7.2 | — | — | — | — | 0.31 | — | — | 1.03 | 2 × 10$^{-8}$ | 825 | 30.1 |
| | 33 | " | 20.3 | 7.2 | — | — | — | 0.32 | — | — | — | 1.10 | 1 × 10$^{-8}$ | 759 | 29.9 |
| | 34 | " | 28.1 | 7.4 | — | — | — | 0.16 | 0.17 | — | — | 1.12 | 1.5 × 10$^{-8}$ | 747 | 29.5 |
| | 35 | " | 34.6 | 7.0 | — | — | — | 0.31 | — | — | — | 1.11 | 2 × 10$^{-8}$ | 743 | 29.6 |
| | 36 | " | 25.4 | 2.6 | — | — | — | 0.34 | — | — | — | 0.91 | | 821 | 29.8 |
| | 37 | " | 25.6 | 12.7 | — | — | — | 0.30 | — | — | — | 1.21 | | 778 | 27.6 |

TABLE 1-continued

| Sample No. | Cu | Ag | Si | Fe | Ni | Co | B | Li | Sn | In | Spread of filler material (cm$^2$) | Vapor Pressure at 600° C. (mmHg) | m.p. (°C.) | Strength of brazed joint (Kg/mm$^2$) |
|---|---|---|---|---|---|---|---|---|---|---|---|---|---|---|
| 38 | " | 25.2 | 7.5 | — | — | — | 0.0012 | — | — | — | 0.92 | $\leq 1 \times 10^{-8}$ | 746 | 29.6 |
| 39 | " | 25.4 | 7.3 | — | — | — | — | 0.0011 | — | — | 0.92 | | 749 | 30.0 |
| 40 | " | 25.0 | 7.5 | — | — | — | 0.79 | — | — | — | 1.16 | | 748 | 29.6 |
| 41 | " | 25.2 | 7.2 | — | — | — | — | 0.77 | — | — | 1.15 | $3.5 \times 10^{-8}$ | 749 | 29.9 |
| 42 | " | 25.2 | 7.0 | — | — | — | 0.31 | — | 1.2 | — | 1.20 | $\leq 1 \times 10^{-8}$ | 747 | 29.2 |
| 43 | " | 25.0 | 7.1 | — | — | — | 0.30 | — | — | 1.1 | 1.22 | | 746 | 28.8 |
| 44 | " | 25.1 | 7.4 | — | — | — | — | 0.33 | 5.8 | — | 1.25 | $2 \times 10^{-8}$ | 738 | 27.6 |
| 45 | " | 25.4 | 7.0 | — | — | — | 0.30 | — | 4.2 | 5.4 | 1.30 | | 733 | 27.3 |
| 46 | " | 25.1 | 6.8 | 1.2 | — | — | 0.31 | — | — | — | 1.09 | | 751 | 31.2 |
| 47 | " | 24.9 | 7.1 | — | 5.9 | — | 0.32 | — | — | — | 1.01 | $\leq 1 \times 10^{-8}$ | 758 | 33.1 |
| 48 | " | 25.3 | 7.3 | — | — | 9.6 | 0.30 | — | — | — | 0.96 | | 777 | 36.2 |
| 49 | " | 25.0 | 7.1 | 2.5 | — | — | 0.31 | — | 6.8 | — | 0.95 | | 744 | 31.8 |
| 50 | " | 25.3 | 7.2 | 3.1 | 4.2 | 2.1 | 0.30 | 0.42 | 3.9 | 2.6 | 1.11 | $2.5 \times 10^{-8}$ | 748 | 32.7 |

*brazed at 900° C.

We claim:

1. A Cu-Ag alloy brazing filler material with low Ag content that exhibits excellent brazability and has a low vapor pressure consisting essentially of 5 to 35% by weight of Ag, 2.5 to 13% by weight of Si, with the balance being Cu and incidental impurities.

2. The Cu-Ag alloy brazing filler material according to claim 1 which further contains 1 to 10% by weight of Sn or In or both.

3. The Cu-Ag alloy brazing filler material according to claim 1 which further contains 1 to 10% by weight of at least one additional element selected from the group consisting of Fe, Ni and Co.

4. The Cu-Ag alloy brazing filler material according to claim 1 which further contains 0.001 to 0.8% by weight of B or Li or both.

5. The Cu-Ag alloy brazing filler material according to claim 2 which further contains 1 to 10% by weight of at least one additional element selected from the group consisting of Fe, Ni, Co.

6. The Cu-Ag alloy brazing filler material according to claim 2, which further contains 0.001 to 0.8% by weight of B or Li or both.

7. The Cu-Ag alloy brazing filler material according to claim 2 which further contains 0.001 to 0.8% by weight of B or Li or both.

8. The Cu-Ag alloy brazing filler material according to claim 5 which further contains 0.001 to 0.8% by weight of B or Li or both.

* * * * *